United States Patent Office 2,815,348
Patented Dec. 3, 1957

2,815,348

PROCESS OF PRODUCING ACETYL CYCLOSERINE

Wallace F. Runge, Terre Haute, Ind., assignor to Commercial Solvents Corporation, Terre Haute, Ind., a corporation of Maryland No Drawing. Application March 21, 1955,
Serial No. 495,749

5 Claims. (Cl. 260—307)

My invention relates to a new chemical compound, and more particularly, it relates to the compound acetyl cycloserine and to a method for producing the same.

Cycloserine is the generic name given to an antibiotic active against tuberculosis in human beings. The identity of the antibiotic chemically is 4-amino-3-isoxazolidinone, the structure of which is:

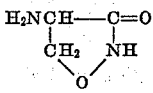

The antibiotic is more fully described in application Serial No. 424,612 by Roger L. Harned and Eleanore K. LaBaw along with a method for producing it by a fermentation process which involves culture of the organism *Streptomyces orchidaceus* NRRL 2454 on an aqueous nutrient medium.

I have now discovered an intermediate in the chemical synthesis of cycloserine which intermediate is readily produced. The intermediate has no antibacterial activity but can be converted to the biologically active antibiotic cycloserine.

My new chemical compound is acetyl cycloserine having the following structural formula:

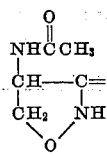

The chemical identity of acetyl cycloserine is 4-acetamido-3-isoxazolidinone. My new compound can be produced by reaction of hydroxylamine and methyl acetamidoacrylate in the presence of a base. Methyl acetamidoacrylate has the following structural formula:

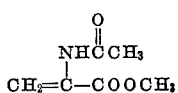

Suitable basic catalysts include alkali metal alkoxides such as, for example, sodium methoxide, potassium methoxide, etc., alkali metal hydroxides such as, for example, sodium hydroxide, potassium hydroxide, etc., organic derivatives of ammonium hydroxide such as, for example, tetramethylammonium hydroxide, etc. An inert solvent for the reaction such as an alcohol is also employed.

In carrying out the reaction, I prefer to employ an excess of the basic catalyst, i. e. amounts in excess of the usual catalytic amounts and I also prefer to employ an excess of hydroxylamine since I have found that such excesses result in improved yields of acetyl cycloserine. Because of the known instability of hydroxylamine, I prefer to avoid the presence of oxygen, water, and heat as much as possible since these conditions promote decomposition of hydroxylamine. Furthermore, while I can use the hydroxylamine as such, I prefer to produce it in situ by neutralizing hydroxylamine hydrochloride to liberate hydroxylamine at the reaction site. Further, I prefer to add the methyl acetamidoacrylate slowly to the hydroxylamine to take advantage of the large excess of hydroxylamine at the beginning of the reaction, agitating to promote rapid mixing of the reagents. Upon completion of the reaction, I acidify the reaction mixture, preferably to a pH of about 4.0, in order to convert the product to the free form, it being obtained in the reaction mixture in the salt form due to the presence of the basic catalyst. In acidifying the reaction product, I avoid excess acidity sufficient to decompose the desired acetyl cycloserine.

The following examples are offered to illustrate my invention; however, I do not intend to be limited to the specific materials, proportions, or procedures set forth. Rather I intend to include within the scope of this invention all equivalents obvious to those skilled in the art.

Example I

Into a 500 ml. 3-necked flask immersed in an ice bath and equipped with mechanical stirrer, nitrogen inlet, and dropping funnel, was placed 5.6 grams of pulverized hydroxylamine hydrochloride and 75 ml. of ethanol. A flow of nitrogen through the flask was begun and 4.32 grams of sodium methoxide in 25 ml. of ethanol then added dropwise with stirring to produce hydroxylamine from hydroxylamine hydrochloride. A 4.32 gram portion of sodium methoxide as catalyst in 25 ml. of ethanol was then added quickly followed by dropwise addition of 5.72 grams of methyl acetamido acrylate in 25 ml. of ethanol. Stirring was continued for one hour after which the mixture was adjusted to pH 4.5 with ethanolic hydrochloric acid and filtered. The solution was then evaporated to dryness and the residue obtained then subjected to high vacuum at room temperature for 48 hours to obtain a dry, solid material. A 2 inch by 16 inch column was then packed with a mixture of 200 grams of diatomaceous earth with 250 ml. of water and the dry, solid reaction product, mixed with 10 grams of diatomaceous earth, packed on the top of the chromatographic column. The column was then developed using a solution of 25% butanol and 75% benzene saturated with water. The effluent was collected in seventeen 400 ml. aliquots. Aliquots 11 through 15 were combined, evaporated to dryness and the solid residue combined with a similar residue from a previous run. The mixture was dissolved in 40 ml. of ethanol, 50 ml. of hydrocarbon solvent was added and the mixture then boiled until a definite turbidity appeared, volume loss being made up by the addition of hydrocarbon solvent. The suspension was then cooled overnight and a brown crystalline precipitate removed by filtration. The crystals were dissolved in 15 ml. of ethanol and the solution placed on a column consisting of a mixture of 5 grams of char and 5 grams of diatomaceous earth. The sample was worked through the column and the effluent in the amount of 200 ml. collected. This solution was stripped to dryness to give a while solid residue which was redissolved in 50 ml. of ethanol, 50 ml. of hydrocarbon solvent being then added and the solution boiled until a definite turbidity appeared, volume loss being made up by the addition of hydrocarbon solvent. The suspension was cooled overnight and the white crystalline solid removed by filtration and dried at room temperature and high vacuum. Melting point 156–158° C. Analysis—Calculated for acetyl cycloserine: C, 41,70%; H, 5.55%; N, 19.44%. Found: C, 41.83%; H, 5.67%; N, 19.10%.

Example II

The process of Example I was repeated using amounts of basic catalyst ranging from 0.25 mole to 10 moles per mole of methyl acetamidoacrylate. The basic catalyst employed was sodium methoxide. The product acetyl cycloserine was obtained.

*Example III*

The process of Example I was repeated using sodium hydroxide, potassium hydroxide, and tetramethyl ammonium hydroxide as the basic catalyst. The product was identified as acetyl cycloserine.

*Example IV*

The process of Example I was repeated employing hydroxylamine in amounts of 1, 2 and 4 moles per mole of methylacetamidoacrylate. The product acetyl cycloserine was obtained.

Now having described my invention, what I claim is:

1. A process for the preparation of acetyl cycloserine having the structural formula

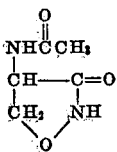

which comprises reacting hydroxylamine with methyl acetamidoacrylate having the structural formula

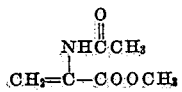

in the presence of a basic catalyst.

2. A process for the preparation of acetyl cycloserine having the structural formula

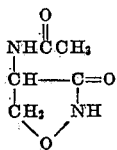

which comprises reacting hydroxylamine with methyl acetamidoacrylate having the structural formula

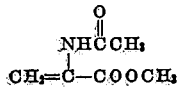

in the presence of a basic catalyst and inert solvent.

3. A process for the preparation of acetyl cycloserine having the structural formula

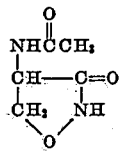

which comprises reacting methyl acetamidoacrylate having the structural formula

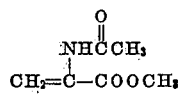

with a molar excess of hydroxylamine in the presence of a basic catalyst.

4. A process for preparation of acetyl cycloserine having the structural formula

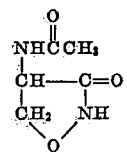

which comprises reacting methyl acetamidoacrylate having the structural formula

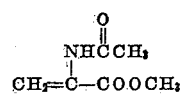

with an excess of hydraxylamine in the presence of a basic catalyst selected from the group consisting of alkali metal alkoxide, alkali metal hydroxide, and alkyl substituted ammonium hydroxide, and acidifying the resultant reaction mixture.

5. The process of claim 4 wherein the hydroxylamine is formed in situ.

References Cited in the file of this patent

FOREIGN PATENTS 715,362    Great Britain _____ Sept. 15, 1954